United States Patent [19]

Burnett

[11] 3,849,772

[45] Nov. 19, 1974

[54] CIRCUIT INTEGRITY CHECKING MEANS FOR AUDIO SIGNAL CIRCUIT

[75] Inventor: Roy Clair Burnett, Owen Sound, Canada

[73] Assignee: General Signal Corporation, Rochester, N.Y.

[22] Filed: Aug. 6, 1973

[21] Appl. No.: 386,136

[30] Foreign Application Priority Data

Sept. 6, 1972 Canada .............................. 151078

[52] U.S. Cl. ................ 340/256, 324/51, 340/253 A

[51] Int. Cl. ...................... G01r 31/02, G08b 19/00

[58] Field of Search ............ 324/51, 52; 340/253 B, 340/256, 409, 253 A, 214, 411

[56] References Cited

UNITED STATES PATENTS

| | | | |
|---|---|---|---|
| 2,556,363 | 6/1951 | Lord et al. | 340/253 B |
| 2,625,596 | 1/1953 | Hines | 340/253 B |
| 2,643,370 | 6/1953 | Lawrence | 324/51 X |
| 3,309,685 | 3/1967 | Manning | 340/256 X |
| 3,441,929 | 4/1969 | Coffer et al. | 340/409 |
| 3,448,447 | 6/1969 | Tetherow | 340/409 |

*Primary Examiner*—Gerard R. Strecker
*Attorney, Agent, or Firm*—Milton E. Kleinman; Harold S. Wynn

[57] ABSTRACT

A means for checking the integrity of a cable pair dedicated to a public address system and having a plurality of loudspeakers bridged thereacross is disclosed. The integrity checking circuit comprises a line supervisory sensor which will provide an indication if there is an open in the dedicated cable pair and/or if there is a shunt below a predetermined minimum value. The loop is monitored through a D.C. circuit and an end of line impedance is provided for circuit continuity. A device, such as a capacitor, is used in series with each loudspeaker bridged across the line for blocking D.C. current. The line supervisory sensor has three states; one of which indicates that there is continuity in the dedicated line and that there is no shunt across the line which is below an acceptable minimum; another of which indicates that the dedicated line has an open; and the last of which indicates that there is a shunt across the line which has a value below an acceptable minimum. The line supervisory sensor may comprise a two-step relay, a plurality of relays, an electronic circuit, or other techniques which may be convenient and expedient.

18 Claims, 5 Drawing Figures

CIRCUIT INTEGRITY CHECKING MEANS FOR AUDIO SIGNAL CIRCUIT

Figure 1:
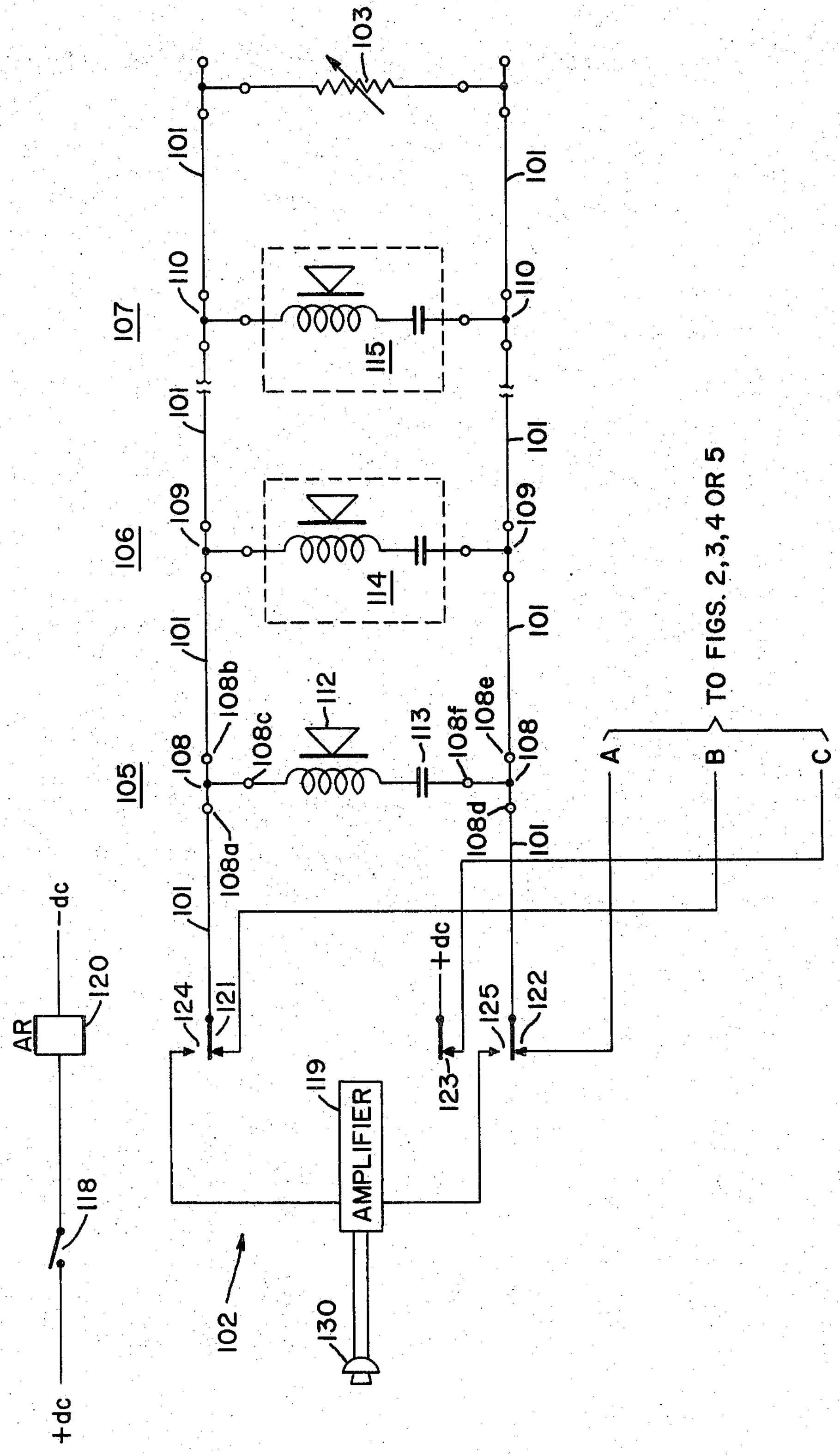

In areas which employ public address systems it is often desirable to provide some means of checking the integrity of cable pairs across which a plurality of loudspeakers may be bridged. Such lines are exposed to potential damage from a wide variety of activities including accidental damage by painters, electricians or plumbers working in the vicinity of the line as well as from the possibility of mischief and/or the unauthorized addition or deletion of loudspeakers on the line. The most common faults which are encountered are line opens and line shorts.

It has been common to attempt to verify the integrity of such line by monitoring the impedance of the line. However, such techniques will not economically and reliably provide an indication of a line open near the remote end of the line nor will it always respond to a shunt condition which does not constitute a direct short circuit but which is sufficient to derogate the quality of the audio signal from the loudspeakers.

The present invention provides a technique for providing a reliable and economical sensor which will monitor the integrity of a line across which a plurality of loudspeakers may be connected. A line supervisory sensor is employed which responds in different manners to different D.C. currents in the line. An end of line impedance is bridged across the remote end of the line for providing direct current continuity. Accordingly, if the line under test should go open the continuity of the circuit will be broken and such break will be indicated by the line supervisory sensor. Normally, bridged loudspeakers would provide a D.C. bridge between the lines and would prevent a test of the nature described. To eliminate this problem a capacitor is placed in series with each loudspeaker to block the flow of direct current therethrough. The use of the capacitor does not have any effect on the audio signals, which are, of course, of an alternating current nature. Should any shunt develop across the line the D.C. current in the line supervisory sensor will be increased and will respond to such increased current by providing an alarm.

The line supervisory sensor may be any of several varieties depending upon a variety of factors. For example, the line supervisory sensor may comprise electromechanical devices such as a two-step relay, or a plurality of relays, or it may comprise electronic circuits which could include transistors and/or logic elements.

It is an object of the invention to provide a new and improved circuit for supervising the integrity of a line having a plurality of loudspeakers bridged thereacross.

It is a more specific object of the invention to monitor the continuity of a line loop and to provide a signal responsive to a reduction in the shunt resistance of the line.

It is another object of the invention to minimize the effect of the loudspeakers bridged across the line on the integrity of the checking circuit.

It is another object of the invention to isolate the loudspeakers from the integrity checking circuit by using blocking capacitors.

It is a specific object of the invention to provide a unique signal if a looped line should go open or if the shunt resistance across the line should fall below a predetermined minimum.

Figures 2, 3, 4, 5:
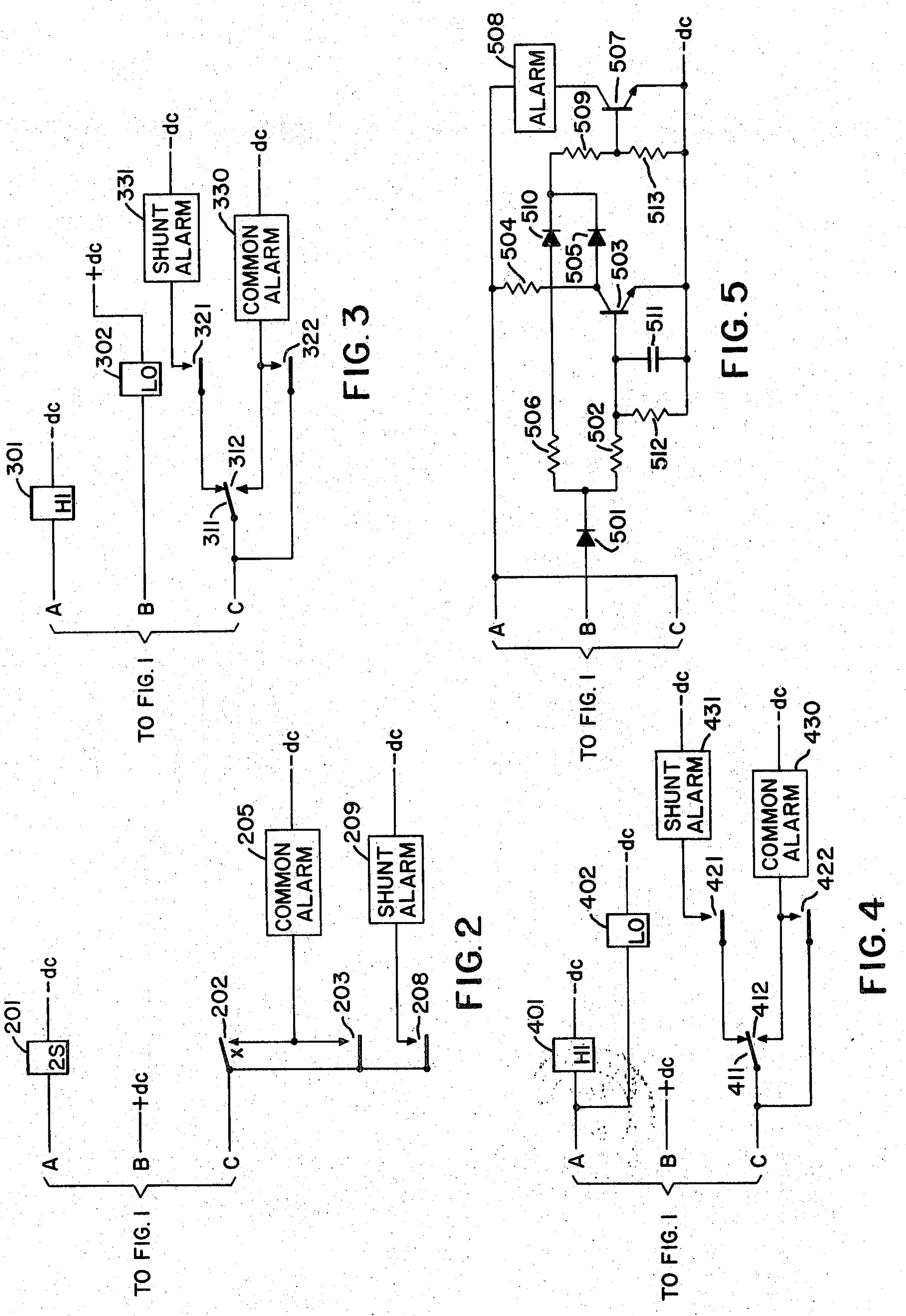

The drawing comprises five figures the first of which may be combined with any one of the others. More specifically, FIG. 1 is a circuit diagram of a looped circuit having bridged loudspeakers and which may be selectively coupled to an amplifier circuit or to another circuit;

FIGS. 2–4 illustrate different forms of line supervisory sensor circuits which may be coupled to the looped circuit of FIG. 1 and which employ electromechanical devices; and FIG. 5 illustrates a line supervisory sensor using transistors which may be selectively coupled to the looped circuit of FIG. 1.

Considering now more specifically FIG. 1, there will be seen a cable pair 101 which extends from a control area 102 and extends to various locations 105, 106 and 107 as may be required and having the remote end thereof terminated by a resistor 103. At a plurality of locations, such as 105, 106, and 107, there may be located a set of connector terminals 108, 109 and 110, respectively. The connector terminals 108–110 are provided to facilitate the connection of a loudspeaker across the cable pair 101. That is, the connector terminal 108 might comprise two pairs of three-screw terminals with the three terminals of each pair electrically interconnected. Thus, in extending the cable pair 101 from the control area 102 to the remote end a first section of the cable pair 101 would be connected to terminals 108*a* and 108*d* of connector terminal 108 and a second section of the cable pair 101 would be extended from location 105 by connecting the cable pair 101 to terminals 108*b* and 108*e* and extending the cable pair 101 to connector terminal 109 at location 106. The terminals 108*c* and 108*f* would then be available at location 105 for bridging a loudspeaker 112 across the cable pair 101 at location 105. As will be explained more fully hereinafter a capacitor 113 is connected in series with the loudspeaker 112. In a typical installation the loudspeaker 112 and the associated capacitor 113 would be physically located in a speaker housing having a pair of wires extending therefrom which would be connected to terminals 108*c* and 108*f*. Other arrangements of terminals and wiring may be made to satisfy the exigencies of the particular installation. In a similar manner a loudspeaker and capacitor 114 or 115 may be bridged across the cable pair 101 at locations 106 or 107, respectively. As indicated by the break in cable pair 101 any desired number of locations, such as 105, 106 and 107, may be located on the cable pair 101 between locations 106 and 107. As already mentioned a resistor 103 will be bridged across the cable pair 101 at the remote end to serve a function to be more fully described hereinafter.

An audio relay 120 is located at the control area 102 and, as will be seen, functions to switch the cable pair 101 between an integrity check circuit (FIGS. 2, 3, 4 or 5) and an audio amplifier 119. In the normal, or quiescent state, the cable pair 101 is coupled to an integrity check circuit. When it is desired to couple the cable pair 101 to the audio amplifier 119 relay 120 will be operated by actuation of contacts 118 which close a circuit to actuate audio relay 120. That is, as may be seen, a positive D.C. potential is connected to one of the contacts 118 and current will flow from the positive D.C. potential through the closed contacts 118 and the coil winding of relay 120 to the negative D.C. potential to actuate the audio relay 120. In response to the actuation of audio relay 120 the normally closed contacts 121, 122 and 123 of audio relay 120 will be opened; and the normally opened contacts 124 and 125 will be closed. As will be seen the closing of contacts 124 and 125 of audio relay 120 will couple the cable pair 101 to the audio amplifier 119. Coupled to the audio amplifier 119 may be a microphone 130 so that any announcements made into the microphone 130 will be amplified by the audio amplifier 119 and heard by those in the vicinity of loudspeakers 112, 114 or 115 at locations 105, 106 or 107, respectively. If desired, any other conventional input to the audio amplifier 119 may be provided. For example, the input could comprise a radio, record player or any other conventional device. As is well known to those skilled in the art the contacts 118 could comprise voice actuated contacts and/or could be actuated by any of a variety of means when it is desired to connect the audio amplifier 119 to the cable pair 101.

As is well known audio signals vary in frequency and magnitude and therefore have the characteristics of an alternating current. Accordingly, the capacitors that are used in series with the loudspeakers 112, 114 and 115 will have no effect on the audio signals which are applied to the cable pair 101. That is, audio signals applied to the cable pair 101 will pass through the loudspeakers 112, 114 and 115 and be heard at locations 105, 106 and 107.

As may be seen when the audio relay 120 is released in response to the opening of contacts 118 the cable pair 101 is no longer connected through operated contacts 124 and 125 of audio relay 120 to the amplifier 119 but is connected through normally closed contacts 121 and 122 to leads A and B which extend to FIGS. 2, 3, 4 or 5. Also, as will be noted, when the audio relay 120 is not operated a positive direct current potential is applied to lead C which extends to FIGS. 2, 3, 4 or 5.

FIGS. 2, 3, 4 and 5 disclose various types of line integrity checking circuits. More specifically, the line integrity checking circuits are provided in order to permit a continuous check on the integrity of the cable pair 101 during the times that the cable pair 101 is not connected to the audio amplifier 119 at the control area 102. More specifically, the integrity checking circuits monitor the cable pair 101 and will provide an alarm signal in the event that the cable pair 101 should accidentally go open or if the line should be shorted by a resistor having a value below some predetermined value which would derogate the quality of the audio signals heard over the loudspeakers. A cable pair 101 may be subject to a wide variety of potential damage depending upon its location. For example, the potential damage to the cable pair 101 will vary depending upon whether the cable pair 101 is located indoors or outdoors, in public or private facilities and factory or office areas. Other factors which might affect the potential damage would include the proximity of the cable pair 101 to other wires or facilities where work may be done and/or the number of times it may be necessary to remove or add loudspeakers. The most probable faults would comprise an inadvertent open of the cable pair and/or a short circuit, or high resistance short, across the pair. Accordingly, an integrity check circuit is provided to give an indication when any one of these conditions may prevail on the cable pair 101. More specifically, it is desired to provode an indication if the cable pair should be open at any point along its length and/or if an impedance having a D.C. resistance below a predetermined amount should be bridged across the line.

Considering now more specifically FIG. 2, it will be seen that the integrity check circuit comprises a two-step relay 201. A two-step relay is a relay which operates in stages. More specifically, a first set of contacts on the relay will operate when a current above a first predetermined minimum flows through the operating winding of the relay; and both the first set of contacts and a second set of contacts will be operated when a current which is greater than a second predetermined minimum and which in turn is greater than said first predetermined minimum, flows through the operating winding of the two-step relay. The contacts 202 associated with relay 201 are the contacts which will operate when the current in the operating winding of the two-step relay exceeds the first predetermined minimum. The contacts 203 and 208 are the contacts which will not be operated until the current in the operating winding of relay 201 exceeds the second predetermined minimum. The contacts 202 are designated with a small x to indicate that they are the preliminary contacts which are actuated in response to the lesser current in the operating winding of relay 201. In addition, the contacts 202 are shown in their operated position inasmuch as that will be the condition of the contacts 202 when the integrity check circuit of FIG. 2 is coupled to the cable pair 101. That is, the contacts 202 would be normally closed when there is no current in the operating winding of relay 201. The contacts 203 and 208 are normally open contacts and will not be closed until such time as a current exceeding the second predetermined value, mentioned above, flows in the operating winding of relay 201.

As previously indicated, the integrity checking circuit of FIG. 2 will be coupled to the cable pair 101 when the audio relay 120 of FIG. 1 is not actuated. Under the named conditions a positive D.C. potential will be applied from the B lead of FIG. 2 and passes to the B lead of FIG. 1 through normally closed contacts 121 to one side of the cable pair 101. If there is neither a short nor an open in the cable pair 101 the current will continue through the upper lead of cable pair 101 from the control area 102 to the remote end and through resistor 103 and back to the other side of the cable pair 101 and to the control area 102 and through closed contacts 122 of relay 120 to lead A and thus to the operating winding of the two-step relay 201 and the negative D.C. potential. The value of the D.C. potential, the operating characteristics of the two-step relay 201 and the setting of the resistor 103 are so selected that when the cable pair 101 is in normal condition a sufficient current will flow through the cable pair 101 and the two-step relay 201 to provide sufficient current in the winding of the relay 201 to actuate the preliminary contacts 202 of the relay 201. That is, as long as there is continuity in the cable pair 101 the preliminary contacts 202 will be open, as shown. As will be seen, contacts 123 of the audio relay of FIG. 1 apply a positive D.C. potential to the C lead.

If the cable pair 101 should experience a break or open, for any reason whatsoever, the current therethrough will be broken and the relay 201 will release.

In response to the release of the relay 201 the preliminary contacts 202 thereof will be closed. With the contacts 202 closed the positive D.C. potential from lead C of FIG. 1 will pass through now closed contacts 202 to actuate the alarm 205 which is connected to a negative D.C. potential. The alarm 205 may comprise a lamp or bell or a repeating relay as may be expedient.

Thus, as has been shown any open which may occur in the cable pair 101 will result in a closure of contacts 202 and the production of an alarm signal from alarm 205. It should be noted that the capacitor 113 in series with the speaker 112 will prevent the flow of the D.C. testing current through the loudspeaker 112. In a similar manner the capacitors associated with the speaker assemblies 114 and 115 will prevent the passage of D.C. current through these loudspeakers. Accordingly, the integrity testing circuit is confined to the cable pair 101 and the resistor 103. The resistor 103 will have an impedance which is high relative to the impedance of the loudspeakers 112, 114 and 115. Accordingly, the resistor 103 will not interfere with the normal operation of any of the loudspeakers bridged across cable pair 101. If a short circuit should develop between the wires of the cable pair 101 the current passing through the two-step relay 201 will be materially increased. If an inadvertent impedance should be accidentally bridged across the lines of the cable pair 101 the current through the two-step relay 201 will still be increased, but not quite as much. It should be noted that the value of the resistor 103 should be appreciably greater that the minimum value of the accpetable shunt between the wires of the cable pair 101. Accordingly, if a shunt resistance should be connected between the wires of the cable pair 101 the current in the two-step relay 201 will be materially increased and will exceed the second predetermined value thereof which will cause the contacts 203 and 208 to be actuated. In response to the actuation of contacts 203 the positive D.C. potential which is applied to the C lead as shown in FIG. 1 will pass through now closed contacts 203 to actuate the alarm 205.

In response to the actuation of alarm 205 a technician will be assigned to locate and clear the trouble which has developed on the cable pair 101. As thus far described the alarm has not provided a specific indication as to whether or not the alarm condition is the result of an open or a shunt condition on the cable pair 101. If it is desired to have some information indicative of the nature of the trouble on cable pair 101 it is possible to provide contacts 208 on two-step relay 201 such that the contacts 208 will be actuated only when there is a shunt condition on the cable pair 101. More specifically, the contacts 208 will be actuated only when contacts 203 are actuated which is only when the current in the relay 201 exceeds the second predetermined minimum value. In response to the actuation of contacts 208 the alarm 209 will be actuated. When it is seen that the alarm 209 is actuated, as well as the alarm 205, it will be known that the fault condition on the cable pair 101 includes a shunt having a resistance below a minimum acceptable value. It should be noted that although the alarm 209 is actuated to indicate a shunt fault it is possible that a simultaneous open fault which is more remote from the control area 102 than the shunt fault, may also exist.

The technician could attempt to isolate and determine the location of the fault by going to an arbitrary one of the locations 105, 106 or 107 and open the cable pair by disconnecting it from the connector terminals 108, 109 or 110. By use of a multimeter, or some other convenient means, the technician could then determine if the fault is located towards the control area 102 or towards the remote end having the resistor 103. The test could be repeated at other locations until the fault is located between two locations. Thereupon, the line may be examined with care until the fault is found and corrective action taken.

Considering now more specifically FIG. 3 there will be seen an alternate variety of an integrity testing circuit which comprises two relays 301 and 302. The relay 301 has a relatively high resistance and a large number of turns of wire on its core and operates on a relatively small current. The relay 302 has a lower resistance, a fewer number of turns on its core and operates in response to a larger current flow. As will be seen the two relays 301 and 302 are connected in series with the cable pair 101 and the resistor 103. More specifically, a circuit may be traced from the positive D.C. potential through the winding of relay 302 to the B lead and normally closed contacts 121 of the audio relay 120 and the upper wire of the cable pair 101, the lower wire of the cable pair 101, the resistor 103, the lower wire of the cable pair 101, and the normally closed contacts 122 of audio relay 120 to the A lead and the winding of the relay 301 to the negative D.C. potential. The relays and potentials selected are such that the relay 301 will be operated and the relay 302 will not be operated. With relay 301 operated the contacts 311 will be closed and the contacts 312 will be opened. With 302 not operated its contacts 321 and 322 will be open. Should an open develop anywhere on the cable pair 101 the relay 301 will be released and contacts 312 will close. In reponse to the closure of the contacts 312 the positive D.C. potential, which is applied to the C lead from contacts 123 of the relay 120, will pass through contacts 312 and operate the common alarm 330. Should a shunt develop across the cable pair 101 the current through the series circuit connecting the relays 301 and 302 will be increased and the relay 302 will operate to close contacts 321 and 322. In response to the closure of the contact 322 the positive D.C. potential on the C lead will complete a circuit to the alarm 330. In addition, the closure of contacts 321 will actuate the shunt alarm 331. As will be noted the alarm 330 will be actuated in response to either an open or shunt condition on the line 101; while the shunt alarm 331 will be actuated only when there is a shunt condition on the cable pair 101. Accordingly, actuation of the alarm 331 will indicate to the technician that he should search for a shunt condition on the line 101. However, it should be observed that actuation of the alarm 331 does not exclude the possibility of an open on the line which is more remote from the control area 102 than the shunt condition.

The technician may attempt to locate and isolate the fault condition on the line 101 by employing the same techniques described with respect to FIG. 2.

Considering now more specifically the circuit of FIG. 4 it will be seen that it is very similar to FIG. 3 except that the relays 401 and 402 are connected in parallel and a positive D.C. potential is applied directly to the B lead. The relay 401, like the relay 301, will be actuated as long as the cable pair 101 does not have an open. A current will flow in both of the relays 401 and 402; but because of their design and operating characteristics only the relay 401 will be actuated if the line 101 is good and there is no shunt having a resistance below a predetermined value across the line. Except for the differences noted the circuit of FIG. 4 functions in essentially the same manner as the circuit of FIG. 3 and corresponding elements thereof have been given corresponding numerical designations except that the first digit of the numerical designation is 4 instead of 3. Except for this difference the description of FIG. 3 reads on FIG. 4 also, and therefore it is felt that no further description of FIG. 4 is required.

Considering now more specifically FIG. 5, there will be seen a transistorized line supervisory sensor circuit which may replace any one of the circuits of FIGS. 2 through 4. As with the circuits of FIGS. 2 through 4 the leads A, B and C. of FIG. 5 are connected to the leads with corresponding designations in FIG. 1. Thus, as may be seen, when the audio relay 120 of FIG. 1 is not actuated, a positive D.C. potential is conducted through contacts 123 to the C lead and as shown in FIG. 5 the C lead is coupled directly to the A lead and therefore the positive D.C. potential is applied to the lower conductor of the cable pair 101 and a current flows through this wire and the resistor 103, the upper wire of the cable pair 101, the closed contacts 121 to the B lead and through diode 501 of FIG. 5. The current continues through resistor 502 to the base element of transistor 503 and to the negative D.C. potential coupled to the emitter electrode of the transistor 503. As a result of this base-to-emitter current, the transistor 503 will be turned on. With transistor 503 conducting, there will be a flow of D.C. current from the positive D.C. potential on the C lead, which is coupled to the A lead, and thence through resistor 504 and the collector-to-emitter electrodes of the transistor 503 to the negative D.C. potential. With the transistor 503 in the conduction state substantially all of the current from resistor 504 will be conducted through the transistor 503 and little if any current will be diverted through the parallel path including diode 505 and resistors 509 and 513. If it is assumed that the cable pair 101 of FIG. 1 is not open circuited and that there is no shunt across the line of cable pair 101 the current flowing through diode 501 will be limited. Because of the prevailing circuit conditions and the values of the circuit components substantially all of the current passing through diode 501 will pass through resistor 502 and there will be little if any current through resistor 506.

With transistor 503 conducting all of the current of resistor 504 will pass through transistor 503, and with substantially no current passing through resistor 506, there will be no current in the base-to-emitter circuit of transistor 507 and it, therefore, will be in a non-conducting state. With transistor 507 in a non-conducting state, no current can pass through alarm 508. That is, when the cable pair 101 is not open circuited and does not have a shunt below a predetermined-minimum value, the transistor 503 will be in a conducting state while the transistor 507 will not be conducting.

In the event that an open circuit condition should exist on the cable pair 101, the circuit therethrough will be opened and no current will flow through diode 501. Accordingly, there will be no base-to-emitter current in the transistor 503 and the transistor 503 will be turned off. However, there will be a current flow from the positive D.C. potential coupled to the C lead which in turn is coupled to the A lead and current will flow through resistor 504. With transistor 503 turned off, the current in resistor 504 will flow through diode 505 and resistor 509 and through the base-emitter circuit of transistor 507 to the negative D.C. potential. The described base-to-emitter current flow of transistor 507 will turn transistor 507 on and current will flow from the positive D.C. potential coupled to the A lead through the alarm 508 and through the collector-to-emitter circuit of transistor 507 to the negative D.C. potential. The alarm 508 may be of any convenient type and/or may include a repeating relay for providing a variety of alarm conditions either remote or local. The diode 510 blocks the current which passed through resistor 504 and turned on transistor 507 from feeding back through resistors 506 and 502 to turn on transistor 503.

It has been shown, thus far, that when no fault condition exists on the cable pair 101, the transistor 503 will be in a conducting state and the transistor 507 will be in a non-conducting state and there will be no alarm condition. However, when there is an open circuit condition on the cable pair 101, the transistor 503 will be turned off and the transistor 507 will be turned on to allow a current flow in the alarm circuit 508.

In the event that a shunt condition having a resistance below a predetermined minimum should exist on the cable pair 101, the current through diode 501 will be materially increased and there will be current flow through resistor 506, diode 510, resistor 509 and the base-to-emitter circuit of transistor 507. As a result of the base-to-emitter current flow of transistor 507, the transistor 507 will be turned on and current may flow, as before, through alarm circuit 508. The diode 505 prevents the current which flows through resistor 506 and diode 510 from passing through the collector-to-emitter circuit of transistor 503.

The diode 501 and capacitor 511 compensate for the effect of speaker line-to-line noise pick-up or distributed capacitance. Resistor 512 controls the D.C. sensitivity of transistor 503. In a similar manner, the resistor 513 controls the D.C. sensitivity of transistor 507.

In summary, it will be seen that either an open circuit or a shunt condition on the cable pair 101 will result in turning transistor 507 on and allowing current to flow through alarm 508.

It should be noted that contact 123 of relay 120 serves to disconnect a positive D.C. potential from the C lead during the time that the cable pair 101 is coupled to the amplifier 119. Accordingly, the integrity check circuits of FIGS. 2 through 5 will not indicate an alarm condition during the time that the cable pair 101 is coupled to the amplifier 119.

While there has been shown and described what is considered at present to be the preferred embodiment of the invention modifications thereto will readily occur to those skilled in the related arts. For example, in another structure PNP transistors could be used in place of NPN transistors. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

The embodiment of the invention in which an exclusive property or privilege is claimed are defined as follows:

1. A direct current supervisory circuit for verifying the circuit integrity of a cable pair across which a plurality of audio devices may be bridged and comprising:

a. a direct current blocking device in series with each of said audio devices for restricting the passage of direct current through said audio devices;
b. an impedance bridged across said cable pair, near the remote end thereof, for providing a direct current circuit across said cable pair; and
c. a three state line supervisory sensor in series with a direct current power supply and selectively bridged across the near end of said cable pair for;

1. indicating the circuit continuity of said cable pair when said line supervisory sensor is in a first of its three states;
2. indicating the lack of circuit continuity of said cable pair when said line supervisory sensor is in a second of its three states; and
3. indicating a low impedance, shunt across said cable pair when said line supervisory sensor is in a third of its three states.

2. An integrity check system for a two conductor line having at least one audio device bridged across it and comprising in combination:

a. a direct current power supply for providing electrical energy,
b. a line supervisory sensor selectively connected in series with said line and said direct current power supply for checking the integrity of said two conductor line;
c. a terminating impedance bridged across said two conductor line for completing a direct current series circuit through said line supervisory sensor, said line, said direct current power supply and said terminating impedance;
d. a direct current blocking element connected in series with said audio device for restricting the passage of direct current through said audio device, and wherein
e. said line supervisory sensor responds to:
1. a high integrity line having neither opens nor shunts below a predetermined value, by assuming a first condition;
2. a first low integrity line condition comprising an open, by assuming a second condition; and
3. a second low integrity line condition comprising a shunt below a predetermined value, by assuming a third condition; and
f. alarm means coupled to said line supervisory sensor for providing a unique signal when said line supervisory sensor has assumed either of said second or third conditions.

3. The combination as set forth in claim 2 and including control means for decoupling said direct current power supply and said line supervisory sensor from said line and for coupling a source of audio signals to said line.

4. The combination as set forth in claim 3 and wherein said control means includes means for preventing said alarm means from providing said unique signal when said control means decouples said line supervisory sensor from said line.

5. The combination as set forth in claim 2 wherein said direct current blocking element comprises a capacitor.

6. The combination as set forth in claim 2 wherein said line supervisory sensor includes a two step relay which has a current of a first magnitude flowing through it when said line supervisory sensor has assumed said first condition and which has a lesser and larger current flowing therethrough when said line supervisory sensor has assumed said second and third conditions, respectively.

7. The combination as set forth in claim 2 wherein said line supervisory sensor includes first and second relays of which one is operated, neither is operated, or both are operated for said first, second and third conditions, respectively.

8. The combination as set forth in claim 7 wherein said relays are in a series connection.

9. The combination as set forth in claim 7 wherein said relays are connected in parallel.

10. The combination as set forth in claim 2 wherein said line supervisory sensor includes first and second transistors of which said first transistor is rendered conducting, said second transistor is rendered conducting, or both are rendered conducting for said first, second and third conditions, respectively.

11. An integrity check circuit for supervising the integrity of a line pair having at least one audio device bridged thereacross and comprising in combination:

a. a capacitor in series with each audio device bridged across said line pair for blocking the passage of direct current through said audio devices;

b. an impedance bridged across said line pair near one end thereof for providing a direct current path from one to the other of the lines of said line pair;

c. a line supervisory sensor and a direct current power source coupled in series and bridged across said line pair near the other end thereof for sensing if the magnitude of the direct current in said line pair, which results from the connection of said direct current power source and said line supervisory sensor is;
1. within prescribed values;
2. below a first prescribed value; or
3. above a second prescribed value; and
d. alarm means coupled to said line supervisory sensor for providing a unique signal when said line supervisory sensor senses a current below or above said first and second prescribed values, respectively.

12. The combination as set forth in claim 11 wherein said line supervisory sensor comprises electromechanical means.

13. The combination as set forth in claim 12 wherein said electromechanical means comprises a two step relay.

14. The combination as set forth in claim 12 wherein said electromechanical means comprises first and second relays of which one is operated, neither is operated and both are operated when the direct current in said line pair is within said prescribed values; below said first prescribed value and above said second prescribed value, respectively.

15. The combination as set forth in claim 11 and including control means for selectively decoupling said direct current power source and said line supervisory sensor from said line pair and coupling a source of audio signals to said line pair.

16. The combination as set forth in claim 15 wherein said control means includes means for inhibiting said alarm means when said control means decouples said direct current power source and said line supervisory sensor from said line pair.

17. The combination as set forth in claim 11 wherein said line supervisory sensor comprises transistor means.

18. The combination as set forth in claim 17 wherein said line supervisory sensor comprises first and second transistors and wherein said:

a. first transistor is rendered conducting when the direct current in said line pair is within said prescribed values;

b. second transistor is rendered conducting when the direct current in said line pair is below said first prescribed value; and c. said first and second transistors are rendered conducting when the direct current in said line pair is above said second prescribed value.

* * * * *